United States Patent [19]
Gambopoulos et al.

[11] 3,976,251
[45] Aug. 24, 1976

[54] SEPARATION OF MAGNESITE FROM ITS CONTAMINANTS BY REVERSE FLOTATION

[75] Inventors: Theodor Gambopoulos; Antony Nestoridis, both of Athens, Greece

[73] Assignee: Financial Mining - Industrial and Shipping Corporation, Athens, Greece

[22] Filed: Dec. 6, 1974

[21] Appl. No.: 530,396

[30] Foreign Application Priority Data
Dec. 19, 1973  Greece.................................... 3410

[52] U.S. Cl. .................................. 241/20; 209/12; 209/166
[51] Int. Cl.² ...................................... B02C 23/18
[58] Field of Search .............. 209/3, 5, 166; 241/20, 241/24, 12

[56] References Cited
UNITED STATES PATENTS

| | | | |
|---|---|---|---|
| 1,445,989 | 2/1923 | Borcheidt | 209/5 X |
| 1,505,323 | 8/1924 | Eberenz | 209/166 |
| 2,831,574 | 4/1958 | Weinig | 209/166 |
| 3,380,666 | 4/1968 | Barnhill | 209/166 X |
| 3,419,140 | 12/1968 | Jepsen | 209/166 X |

Primary Examiner—Robert Halper
Attorney, Agent, or Firm—Watson, Cole, Grindle & Watson

[57] ABSTRACT

Magnesite ores are upgraded by the removal of the contaminants from the ore by a reverse flotation treatment thereof. Removal is carried out with the aid of a mixture of quaternary ammonium compounds and primary amines in combination with the use of impure kerosene.

8 Claims, 1 Drawing Figure

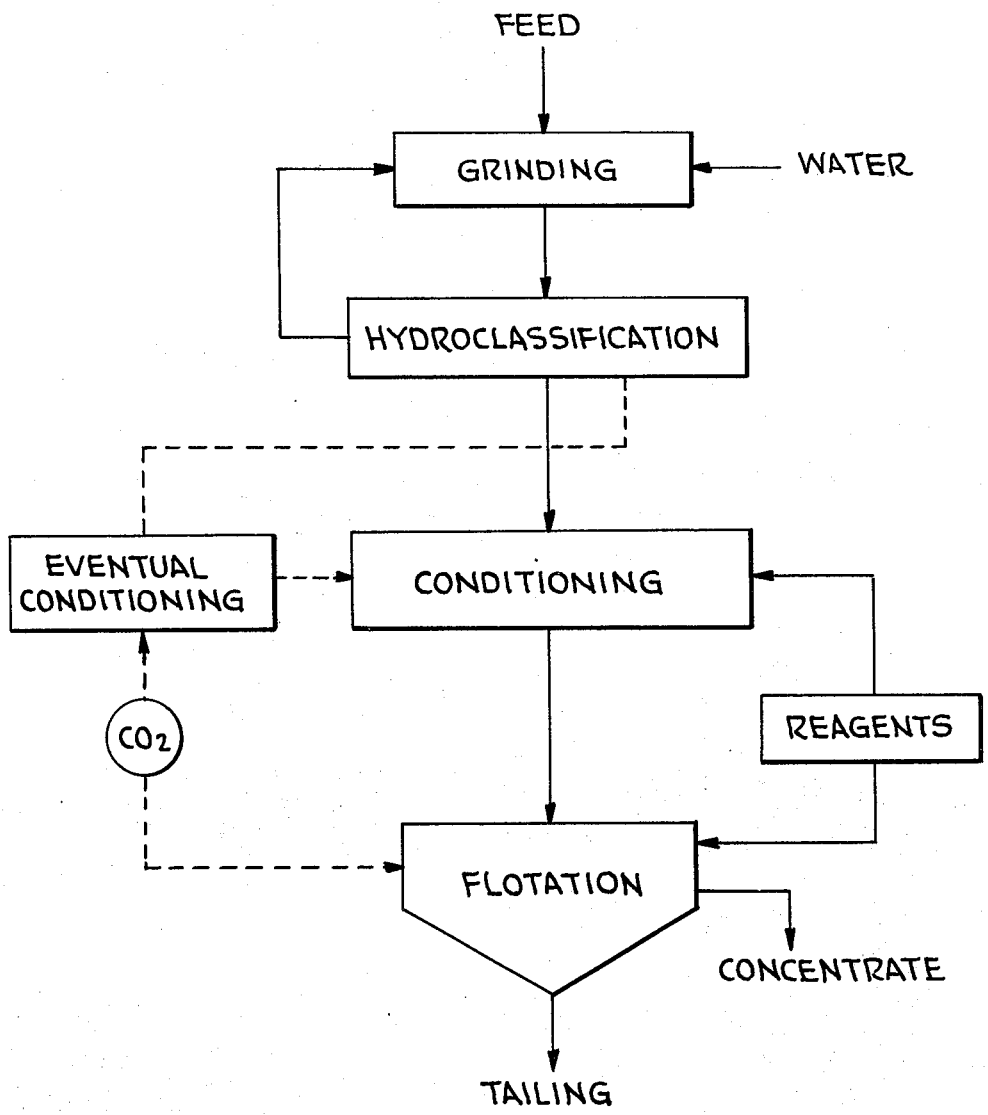

SEPARATION OF MAGNESITE FROM ITS CONTAMINANTS BY REVERSE FLOTATION

BACKGROUND OF THE INVENTION

This invention relates generally to a process of separating the different substances of ore, and more particularly to a reverse flotation process for the separation of magnesite from its contaminants.

The direct flotation method normally utilized for the separation of different substances, as for example magnesite, requires that the entire magnesite ore undergo flotation, particularly those magnesite ores having a relatively low content in contaminants. Moreover, the removal of silicates and iron by the direct method cannot be effected to a desirable degree.

The invention represents a simple manner of treatment as well as of the choice of adequate reagents for the flotation so that the removal of the contaminants from the magnesite can be achieved quantitatively and selectively even in the presence of a large proportion of slimes. Generally, the meaning of slimes in connection with the present invention is given to the overly ground ore particles of below 20 and up to 30 microns in size.

SUMMARY OF THE INVENTION

The present invention involves a process of upgrading different magnesite ores (magnesium carbonate ores) by reverse flotation, namely by removal of the contaminants from the ore (which are found under different mineral forms, associated with silica, iron, calcium and aluminum) on the froth of the flotation. The removal of the contaminants is carried out with the aid of a mixture of quaternary ammonium compounds and primary amines in combination with the use of impure kerosene.

By reverse flotation in accordance with the present approach, the silica of up to 12 percent and the iron of up to 1.40 percent contained in the ore can be each lowered to about 0.08 percent while, by the direct flotation approach, it is difficult to lower the silica content to 1 percent.

The quantitative and selective removal of the contaminants implies an increase of magnesium carbonate recovery as well as the acquisition of a very pure product almost completely free of silica, iron, aluminum and partly of calcium, suitable (after a certain treatment) for the manufacturing of high-grade basic refractory bricks.

BRIEF DESCRIPTION OF THE DRAWING

The single drawing FIGURE is a flow diagram showing the reverse flotation process carried out in accordance with the invention.

DESCRIPTION OF THE PREFERRED EMBODIMENT

The presently devised reverse flotation method, after being previously investigated on a bench scale, was applied to a pilot plant under continuous operation.

Crushed magnesite ore is subjected to a wet grinding operation, as shown in the drawing FIGURE, for the purpose of physically liberating the gangue from the valuable ore and for achieving a more adequate grain size composition. This grinding operation should be carried out selectively to a sufficient degree to avoid, as much as possible, the formation of slimes so that the latter is maintained at low percentages of the ground ore. In this connection, it has been found that the percentages of silica and calcium in the slimes are lower than in the coarser particles, while the reagent consumption of the coarser particles is much lower than of the corresponding amount of slimes.

Among the many flotation tests carried out in the pilot plant, only a typical application of the devised flotation method is herein disclosed. Specifically shown is the treatment of a series of magnesite ores, with serpentine, deriving from different ore deposits.

Table 1 below shows the chemical analysis fluctuations of the contaminants of the feed flotations, concentrates and tailings.

Table 1

| Component | Feed Percent | Concentrate Percent | Tailing Percent |
|---|---|---|---|
| $SiO_2$ | 2.0 – 12.0 | 0.08 – 0.20 | 30.5 – 38.0 |
| CaO | 1.04 – 1.76 | 0.94 – 1.39 | 1.19 – 3.35 |
| $Fe_2O_3$ | 0.59 – 1.40 | 0.08 – 0.14 | 5.0 – 6.1 |
| $Al_2O_3$ | 0.03 – 0.07 | traces – 0.02 | 0.06 – 0.28 |

The flow diagram of the drawing FIGURE summarizes the flotation operation of the invention. For the purpose of achieving an agglomerated and compacted froth during the flotation step, it is preferable to add reagents at different stages of the flotation process instead of at one stage only.

Flotation of the magnesite ore contaminants succeeds only in a neutral medium, namely, at a small pH of 6.8 to 7.2. For ores which have been subjected to a caustization for some unknown reasons, or to weathering laterations (disintegrations), the flotation becomes difficult, even impossible, particularly when the pH of the pulp reaches 10. The high alkalinity of certain serpentinic ores is due to the presence of free magnesium oxide, namely the magnesium hydroxide in the pulp which acts alkalinely and, consequently, the different cationic reagents do not ionize properly. Hence, their difficulty of reacting on silicates becomes apparent.

The pH adjustment fully succeeds by passing carbon dioxide to the pulp after the grinding operation. An additional advantage in using $CO_2$ is that its supply is unlimited because of its abundant production from the magnesite caustization as well as from the roasting kilns of the dead burned magnesite. Another advantage is that the free magnesium oxide can be recovered from the magnesite ore.

One of the principal advantages of the presently devised method is that the treatment can be successfully performed in the presence of slimes, due to the fact that the 38 microns (400-mesh) grain size particles unavoidably attain a percentage of 75 to 80 and 51 during grinding in a ball mill and in a rod mill, respectively.

The use of primary amines as mentioned in public literature respecting flotation of silicates cannot, however, be used generally for negatively charged contaminants in the presence of slimes. On the contrary, as was discovered on the bench scale, the primary amines with the aid of impure kerosene for ore particles larger than 38 microns (400-mesh), act favorably on the flotation of the silicates with relatively low reagent consumptions.

Since a large portion of the ground ore is constituted by particles under 38 microns, discovery of a reagent, which is able to selectively flocculate the suspended particles of the pulp, as well as avoiding the heterocoagulation of the contaminants with the magnesite, becomes imperative.

It was discovered that the quaternary ammonium compounds act successfully in this regard. Specifically, the dialkyl quaternary ammonium chlorides, such as ARQUAD 2C-75%, ARQUAD 2HT-75% as well as praepagen WK have the property to selectively flocculate the fine particles of the negatively charged pulp up to the colloidal silicates. Nearly the same results have been obtained by using certain mono-alkyl quarternary ammonium chlorides, such as ARQUAD C/50 and ARQUAD T/50, but with a higher consumption.

Another approach used in achieving success with the presently devised method was the use of certain primary amines in combination with a quaternary ammonium compound, so that finally only one mixture solution of cationic collectors may be used. As primary amines, ARMAC T, ARMAC C and ARMAC 12D in combination with the ARQUAD 2C-75% have been used with the present development.

The use of impure kerosene has proven to be a good assisting collector. Its action, perhaps, is due to the further adhering and extension of various hydrocarbons of the kerosene of non-polar groups of the cationic collectors, and even on different materials of the ore so as to facilitate finally the bubble air adhesions and, consequently, the flotation.

In combination with the kerosene, a frother such as Flotal B, or Pine oil for the froth surface tension adjustment may be used.

The properties in percentages of a typical aqueous solution (2.5 weight percent by volume) of the reagents used for the flotation of the contaminants in the presence of slimes are given in Table 2 below.

Table 2

| Collector: | Percent: |
|---|---|
| ARQUAD 2C-75% | 81 |
| ARMAC T | 10 |
| ARMAC C | 4.5 |
| ARMEEN 12D | 4.5 |

The reagent consumption and particularly for the mixture (calculated without water) amounts from 2.5 to 4.2 kg per metric ton of produced concentrate ore, while the consumption of kerosene as well as of the froth amounts to 14–24 kg, and 2 kg per metric ton, respectively. Although a relatively high reagent consumption is observed for the devised and applied flotation method, this method nevertheless remains economically feasible for eventual industrial plant application because of the high grade of the concentrate. The yield of concentrate by weight (with 46 to 47 percent in MgO) amounts to at least 80 to 90 percent and even higher in the recovered magnesite.

Based on the feed ore analyses (see Table 1), as well as on the concentrates produced from them, and apart from the total removal of silica, iron, as well as of aluminum, a lime decrease of the concentrates is observed to an amount ranging between 10 to 21 percent on the initial analysis.

It has been proven on the bench scale that flotation can be performed with greater success with regard to the lime removal (up to 40 percent), as well as with a decrease of reagents, if the pulp before undergoing flotation is passed through a hydrocyclone for a coarser size separation, i.e., 400- to 500-mesh from the finer particles, and if both the finer and coarser fractions are thereafter separately treated with the mixture of cationic collectors in combination with the impure kerosene. This is based on the observation that the lime removal from the coarser particles reaches 54 percent while the decrease of lime for the corresponding slime or fine particles scarcely reaches 31 percent.

Primary amines are mainly used as flotation reagents for the coarser particles (those reagents already mentioned in Table 2 above) in the same proportions between them, so that their percentage total amounts to about 90 percent, and for the remaining 10 percent a quaternary ammonium compound is used. On the contrary, for the finer particles of the slime, the greater portion of the 90 percent consists of a quaternary ammonium compound.

Obviously, many modifications and variations of the present invention are made possible in the light of the above teachings. It is therefore to be understood that within the scope of the appended claims the invention may be practiced otherwise than as specifically described.

What is claimed is:

1. A process for separating magnesite from its contaminants by a reverse flotation treatment of crushed magnesite ore which contains as its main constituents magnesium carbonate, and contaminants such as silica, generally silicate compounds of iron, aluminum and calcium, comprising the steps of:
    wet grinding the crushed ore to obtain a pulp having a grain size of not more than 0.21 millimeter and a minimum amount of slime;
    adjusting the density of the pulp to between about 20 and about 30 percent by weight of solids;
    adjusting the pH of the pulp, without removal of the slime, to a value of 6.8 to 7.2;
    adding to the pulp, including the slime, a mixture of cationic collectors in combination with impure kerosene and a frother at different intervals in the flotation process to assist in the separation of contaminants;
    removing the contaminants in the froth; and removing the magnesite concentrate as the sunk pulp.

2. A process for separating magnesite from its contaminants by a reverse flotation treatment of crushed magnesite ore which contains as its main constituents magnesium carbonate, and contaminants such as silica, generally silicate compounds of iron, aluminum and calcium, comprising the steps of:
    wet grinding the crushed ore to obtain a pulp having a grain size of not more than 0.21 millimeter and a minimum amount of slime;
    adjusting the density of the pulp to between about 20 and about 30 percent by weight of solids;
    adjusting the pH of the pulp, without removal of the slime, to a value of 7.0 with the use of $CO_2$;
    addng to the pulp, including the slime, a mixture of cationic collectors in combination with impure kerosene and a frother at different intervals in the flotation process to assist in the separation of contaminants;
    removing the contaminants in the froth; and
    removing the magnesite concentrate as the sunk pulp.

3. The process according to claim 2, wherein the cationic collectors consist of quaternary ammonium compounds which provides for the selective coagulation and flotation of negatively charged grains as well as of the slime of the pulp.

4. A process for separating magnesite from its contaminants by a reverse flotation treatment of crushed magnesite ore which contains as its main constituents magnesium carbonate, and contaminants such as silica, generally silicate compounds of iron, aluminum and calcium, comprising the steps of:
- wet grinding the crushed ore to obtain a pulp having a grain size of not more than 0.21 millimeter and a minimum amount of slime;
- adjusting the density of the pulp to between about 20 and about 30 percent by weight of solids;
- adjusting the pH of the pulp, without removal of the slime, to a value of 6.8 to 7.2;
- adding to the pulp, including the slime, a mixture of cationic collectors in combination with impure kerosene and a frother at different intervals in the flotation process to assist in the separation of contaminants, the cationic collectors consisting of quaternary ammonium compounds in combination with primary amines;
- removing the contaminants in the froth; and
- removing the magnesite concentrate as the sunk pulp.

5. The process according to claim 4, wherein the cationic collector reagents are utilized in an amount ranging from 2.5 to 4.2 kg per metric ton and the impure kerosene is utilized in an amount ranging from 14 to 24 kg per metric ton.

6. A process for separating magnesite from its contaminants by a reverse flotation treatment of crushed magnesite ore which contains as its main constituents magnesium carbonate, and contaminants such as silica, generally silicate compounds of iron, aluminum and calcium, comprising the steps of:
- wet grinding the crushed ore to obtain a pulp having a grain size of not more than 0.21 millimeter and a minimum amount of slime;
- adjusting the density of the pulp to between about 20 and about 30 percent by weight of solids;
- adjusting the pH of the pulp, without removal of the slime, to a value of 6.8 to 7.2;
- classifying the pulp in a hydrocyclone to separate coarse particles from fine particles;
- adding to each fraction of the classified pulp a mixture of cationic collectors in combination with impure kerosene and a frother at different intervals in the flotation process to assist in the separation of contaminants;
- removing the contaminants in the froth; and
- removing the magnesite concentrate as the sunk pulp.

7. The process according to claim 6, wherein the flotation of the coarse particles is carried out with the aid of the mixture consisting of about 90 percent primary amines and the remainder consisting of a quaternary ammonium compound.

8. The process according to claim 7, wherein the flotation of the slime is carried out with the aid of the mixture consisting of a quaternary ammonium compound of about 90 percent and the remainder consisting of primary amine compounds.

* * * * *